(12) United States Patent
Saha et al.

(10) Patent No.: US 10,657,181 B2
(45) Date of Patent: May 19, 2020

(54) QUERY SUGGESTIONS USING ONTOLOGY PARTITIONS

(71) Applicant: International Business Machines Corporation, Armonk, NY (US)

(72) Inventors: Diptikalyan Saha, Bangalore (IN); Karthik Sankaranarayanan, Bangalore (IN); Jaydeep Sen, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 431 days.

(21) Appl. No.: 15/298,033

(22) Filed: Oct. 19, 2016

(65) Prior Publication Data

US 2018/0107760 A1 Apr. 19, 2018

(51) Int. Cl.
*G06F 16/9032* (2019.01)
*G06F 16/84* (2019.01)
(Continued)

(52) U.S. Cl.
CPC .. *G06F 16/90328* (2019.01); *G06F 16/24554* (2019.01); *G06F 16/84* (2019.01); *G06F 16/9024* (2019.01); *G06F 16/90344* (2019.01)

(58) Field of Classification Search
CPC ......... G06F 17/30867; G06F 17/30424; G06F 17/30979; G06F 17/30994; G06F 17/2785; G06F 17/30696
See application file for complete search history.

(56) References Cited

U.S. PATENT DOCUMENTS

2010/0281025 A1* 11/2010 Tsatsou ................. G06F 16/335
707/733
2013/0290366 A1* 10/2013 Boyle ............... G06F 17/30672
707/767
(Continued)

OTHER PUBLICATIONS

Wu, Yinghui et al., "Ontology-based Subgraph Querying", 29th IEEE International Conference on Data Engineering (ICDE), Brisbane, Australia, Apr. 8-11, 2013, 12 pages, IEEE Digital Library.

*Primary Examiner* — Yuk Ting Choi
(74) *Attorney, Agent, or Firm* — Ference & Associates LLC

(57) ABSTRACT

One embodiment provides a method, including: utilizing at least one processor to execute computer code that performs the steps of: receiving a partially completed query request from a user, wherein the partially completed query request comprises at least one text string provided in a query field; mapping the at least one text string to at least one ontology element contained within at least one of a plurality of partitions in an ontology graph, the graph comprising (i) ontology elements represented as nodes and (ii) connections between ontology elements represented as edges, wherein each of the plurality of partitions corresponds to a subject area of a field and comprises ontology elements corresponding to concepts related to the subject area of the field; and generating, in view of the plurality of partitions, at least one suggestion for completing the query request to the user, wherein the at least one suggestion comprises a semantically relevant suggestion corresponding to the at least one text string provided in the query field. Other aspects are described and claimed.

20 Claims, 5 Drawing Sheets

(51) Int. Cl.
*G06F 16/901* (2019.01)
*G06F 16/2455* (2019.01)
*G06F 16/903* (2019.01)

(56) References Cited

U.S. PATENT DOCUMENTS

| | | | |
|---|---|---|---|
| 2014/0379755 A1* | 12/2014 | Kuriakose | G06F 17/3043 707/780 |
| 2016/0117395 A1* | 4/2016 | Geller | G06F 17/30672 707/706 |
| 2016/0140232 A1 | 5/2016 | Smirnov et al. | |

* cited by examiner

US 10,657,181 B2

QUERY SUGGESTIONS USING ONTOLOGY PARTITIONS

BACKGROUND

When a user is attempting to find an electronic file or result, the user may provide a query into a system. For example, when a user is trying to find more information about a particular subject, the user may type a search term or phrase into an Internet search engine. As another example, a user may be trying to find a particular word or phrase within a document, file folder structure, or the like and may provide at least part of the word or phrase as a search term into the search field associated with the application or window.

However, a user may be unable to articulate the correct search query or remember the exact phrase contained within the document, file, or the like. For example, a user may be attempting to find more information regarding how data structures are accessed and processed in computer systems. However, the user may be unable to articulate the search query in such a way that produces search results that are relevant to what the user actually wanted to know. As another example, the user may be attempting to find a word processing document that includes a particular paragraph that the user wants to review. However, the user may be unable to remember the exact phrase(s) used in the document in order to provide a query that results in the desired document. Accordingly, some systems may provide suggestions for completing the query as the user is providing the query or after the user has provided part of the query.

BRIEF SUMMARY

In summary, one aspect of the invention provides a method, comprising: utilizing at least one processor to execute computer code that performs the steps of: receiving a partially completed query request from a user, wherein the partially completed query request comprises at least one text string provided in a query field; mapping the at least one text string to at least one ontology element contained within at least one of a plurality of partitions in an ontology graph, the graph comprising (i) ontology elements represented as nodes and (ii) connections between ontology elements represented as edges, wherein each of the plurality of partitions corresponds to a subject area of a field and comprises ontology elements corresponding to concepts related to the subject area of the field; and generating, in view of the plurality of partitions, at least one suggestion for completing the query request to the user, wherein the at least one suggestion comprises a semantically relevant suggestion corresponding to the at least one text string provided in the query field.

Another aspect of the invention provides an apparatus, comprising: at least one processor; and a computer readable storage medium having computer readable program code embodied therewith and executable by the at least one processor, the computer readable program code comprising: computer readable program code that receives a partially completed query request from a user, wherein the partially completed query request comprises at least one text string provided in a query field; computer readable program code that maps the at least one text string to at least one ontology element contained within at least one of a plurality of partitions in an ontology graph, the graph comprising (i) ontology elements represented as nodes and (ii) connections between ontology elements represented as edges, wherein each of the plurality of partitions corresponds to a subject area of a field and comprises ontology elements corresponding to concepts related to the subject area of the field; and computer readable program code that generates, in view of the plurality of partitions, at least one suggestion for completing the query request to the user, wherein the at least one suggestion comprises a semantically relevant suggestion corresponding to the at least one text string provided in the query field.

An additional aspect of the invention provides a computer program product, comprising: a computer readable storage medium having computer readable program code embodied therewith, the computer readable program code executable by a processor and comprising: computer readable program code that receives a partially completed query request from a user, wherein the partially completed query request comprises at least one text string provided in a query field; computer readable program code that maps the at least one text string to at least one ontology element contained within at least one of a plurality of partitions in an ontology graph, the graph comprising (i) ontology elements represented as nodes and (ii) connections between ontology elements represented as edges, wherein each of the plurality of partitions corresponds to a subject area of a field and comprises ontology elements corresponding to concepts related to the subject area of the field; and computer readable program code that generates, in view of the plurality of partitions, at least one suggestion for completing the query request to the user, wherein the at least one suggestion comprises a semantically relevant suggestion corresponding to the at least one text string provided in the query field.

A further aspect of the invention provides a method, comprising: utilizing at least one processor to execute computer code that performs the steps of: receiving, from a user, a partially completed query request provided in a query field; and providing, to the user, at least one suggestion for completing the query request, wherein the providing at least one suggestion comprises: accessing an ontology graph related to a domain of the partially completed query request, wherein the ontology graph comprises a plurality of ontology elements, each ontology element comprising a concept represented by a node within the ontology graph and connections between the nodes being represented by edges within the ontology graph; partitioning the ontology elements of the ontology graph into functional partitions, each functional partition comprising ontology elements having a semantic relationship between other ontology elements of the partition; mapping at least a subset of the partially completed query request to at least one of the ontology elements; identifying each of the functional partitions containing the mapped-to ontology elements; and generating at least one suggestion in view of each of the identified functional partitions.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
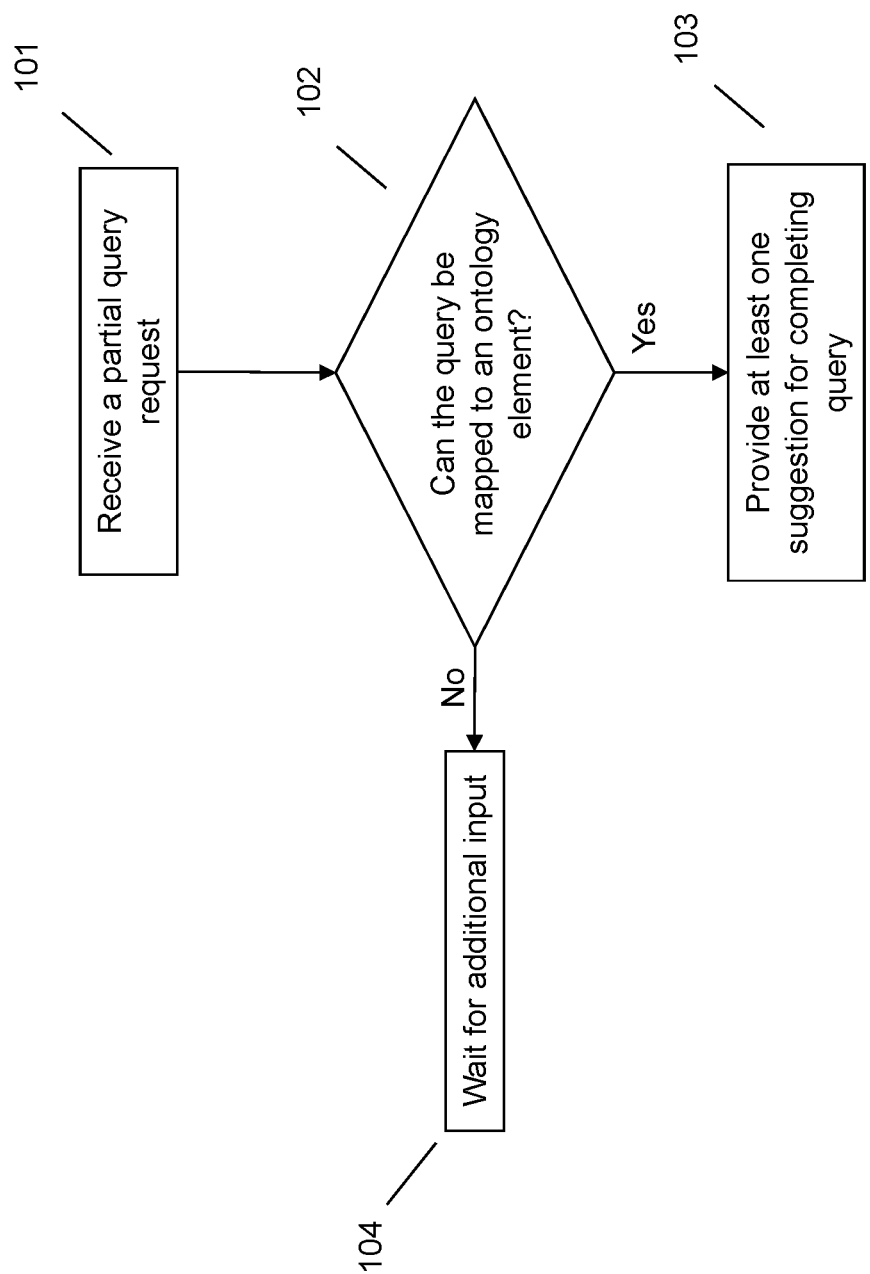
FIG. 1 illustrates a method of providing query suggestions using ontology partitions.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

As a user starts to provide a query, a system (e.g., search engine provider, application, etc.) may attempt to assist the user in completing the query by providing possible suggestions. For example, as a user is typing the phrase "computer system" into a query field, the search engine may provide a suggestion box including "analyst," "validation," "definition," and "cooling parts," as possible suggestions for completing the query. As the user provides more input to the query field, the suggestions provided may be modified. In other words, as the user provides more detail, the suggestions may become more closely related to what the user is actually attempting to search. While the example of a search engine has been provided, it should be understood that other applications work similarly. For example, as a user provides a search term into a search field in a file system window, suggestions for completing the search terms may be provided.

Currently, a system for providing query suggestions relies on query logs. As one or more users provide queries into fields, the system collects the queries and stores them in a log file. The system may then analyze the query logs to create a probabilistic model of possible query suggestions. In creating the probabilistic model, the system may determine a correlation between the provided query and the results that the user actually selected. Then, as users start to provide queries, the system provides query suggestions based upon the queries and the subsequent selections. As an example, the system may provide query completion suggestions that contain phrases from the most frequently provided queries by other users. In another example, the system may provide query completion suggestions that contain phrases from the most frequently selected results when other users have provided the same or similar query results.

The system may also use query logs of a particular user. For example, when a user is providing a search term into a search function of an application, the search function may provide suggestions based upon search terms that the user has previously provided. As an example, a user may start to provide a search term and once the user has provided the first letter, the search function may provide suggestions based upon previous search terms starting with that same letter that have been previously provided by the user. As another example, the user may select the search function of an application, and the search function may provide suggestions based upon the most frequently or most recently provided search term. The problem with using query logs is that the system needs the system logs. Thus, the system cannot provide query suggestions until or unless the system has access to the query logs. Additionally, if the query logs exist, but only a few queries exist, the query suggestions may be inaccurate or not relevant to the query the user is providing. Additionally, the suggestions based upon query logs may not be relevant to the user. For example, if many users query something completely unrelated to the query the user is attempting to complete (but containing the same or similar words), the query suggestions provided to the user may be useless to the user.

Another approach to provision of query suggestions is through the use of a probabilistic framework based upon one or more document corpora. The system generates a probabilistic framework using the one or more document corpora by determining the relationship of words and phrases within the document corpora. Thus, when a user starts to provide a query the suggestions are based upon words and phrases as used in the document corpora that were used to generate the framework. The problem with such an approach is that the model is very sensitive to the document corpora that were chosen to derive the model. In other words, the query suggestions will be strongly based upon how words and phrases were presented in the document corpora. If the user's query is different from what is provided in the document corpora, the suggestions provided to the user will be unhelpful.

Accordingly, an embodiment provides a method of providing query suggestions that are semantically relevant to the query provided by the user. An embodiment may receive a partially completed query request from a user. The query request may include a text string provided into a query field (e.g., search function of an application, search field of a search engine, etc.). The system may then map one or more of the text strings to one or more ontology elements contained within one or more ontology partitions. The ontology partitions may be created from an ontology graph. The ontology graph may include ontology elements that are related to a particular field or domain. For example, the ontology graph may be related to the finance domain, engineering domain, legal domain, and the like. Each of the elements may include a concept and may have a relationship with other elements. The ontology graph may then be divided into partitions, where each of the partitions contains elements having a functional relationship between each other.

Once the system has mapped the text string(s) to at least one of the ontology elements, the system may identify which partitions include the mapped-to element(s). For example, if the text string is mapped to two different elements, the system may identify the two partitions which include these elements. The system may then provide suggestions for completing the query based upon the partitions. The suggestions may be generated by traversing paths in the ontology graph within the specified partitions identified by the mapped ontology elements. Each text string can be mapped to one or more ontology elements. Additionally, multiple combinations of text string to ontology elements mapping may be possible. Each mapping may have multiple partitions that are spanned and each partition may produce multiple query suggestions.

In one embodiment the suggestions may be based upon the partitions having a direct connection to the text string. For example, the text string could be mapped to any of a number of ontology elements that may span one or more partitions. However, in the system described herein, the suggestions may only be based upon partitions which are directly mapped to the text string. The suggestions may also be ranked based upon the relatedness of the suggestions to the query. The relatedness of the suggestions may be based upon the number of edges in the ontology graph spanned by the suggestion. As a user provides additional text strings into the query field, the suggestions may be updated.

Such a system provides a technical improvement over current systems for providing query suggestions. The systems and methods as described herein provide a method for providing query suggestions that are not only related to the user's query, but are also semantically valid query completion suggestions. The system makes use of ontology graphs which define concepts and relationships between the concepts. The system is then able to partition the concepts and relationships into functionally related partitions. As a user provides a query, the system can map words or phrases contained within the provided query to one or more of the partitions. The query suggestions are then based upon the different partitions, which results in query suggestions that are semantically relevant to the query provided by the user. Such a system does not require the use of query logs. Thus, if no query logs are available, the system can still provide semantically relevant query suggestions. Additionally, because the system is not based on query logs, the suggestions are not modified based upon queries provided by other users. The system is also not sensitive to document corpora used to train a model, because the system does not use such models and document corpora. Thus, the system as described herein provides a system that provides query suggestions which are semantically relevant to a user and not sensitive to other factors making the query suggestions more accurate and relevant to the user.

Referring now to FIG. 1, an embodiment may receive a partially completed query request from a user at 101. The query request may be provided in a query field, for example, a search engine search field, a search field of an application, a query field of a file window, and the like. The query may include one or more text strings, also referred to herein as a token. A text string may include a fully or partially completed word or phrase. For example, the text string may include the first three letters of a six letter words. As another example, the text string may include a complete word and part of another word. As another example, the text string may include an entire word or phrase with no partial words. The text string may also include any length and/or combination of symbols, characters, numbers, and the like. The text string may also include handwritten or machine input text. In other words, the text string may include any type of query that a user may provide into a query field.

At 102, an embodiment may determine whether all or part of the query can be mapped to an ontology element. An ontology element may include a concept, property, or relation of an ontology graph. An ontology graph represents a field or domain and contains a set of concepts and relationships between the concepts. For example, an ontology graph may include concepts and relationships between the concepts related to the financial domain, the engineering domain, the legal domain, the medical domain, and the like. The ontology graph may include real-world entities called individuals which are grouped into concepts based upon similarity of characteristics between the individuals. A property may represent a characteristic of a concept and may belong uniquely to that concept. A relation represents a relationship between concepts.

The relations may include membership relations, inheritance relations, functional relations, and the like. A membership relation identifies a concept that is a union concept and a member concept, meaning the member concept belongs to the union concept. A union concept will not contain any individuals that are also not contained by a member concept. The member concept will inherit the properties associated with the union concept. An inheritance relation identifies a concept that is a parent concept and a child concept of the parent. The parent concept can contain individuals that are not present in a child concept. The child concept will inherit any of the properties of the parent concept. The remaining relations of the ontology are considered functional relations.

Figure 2:
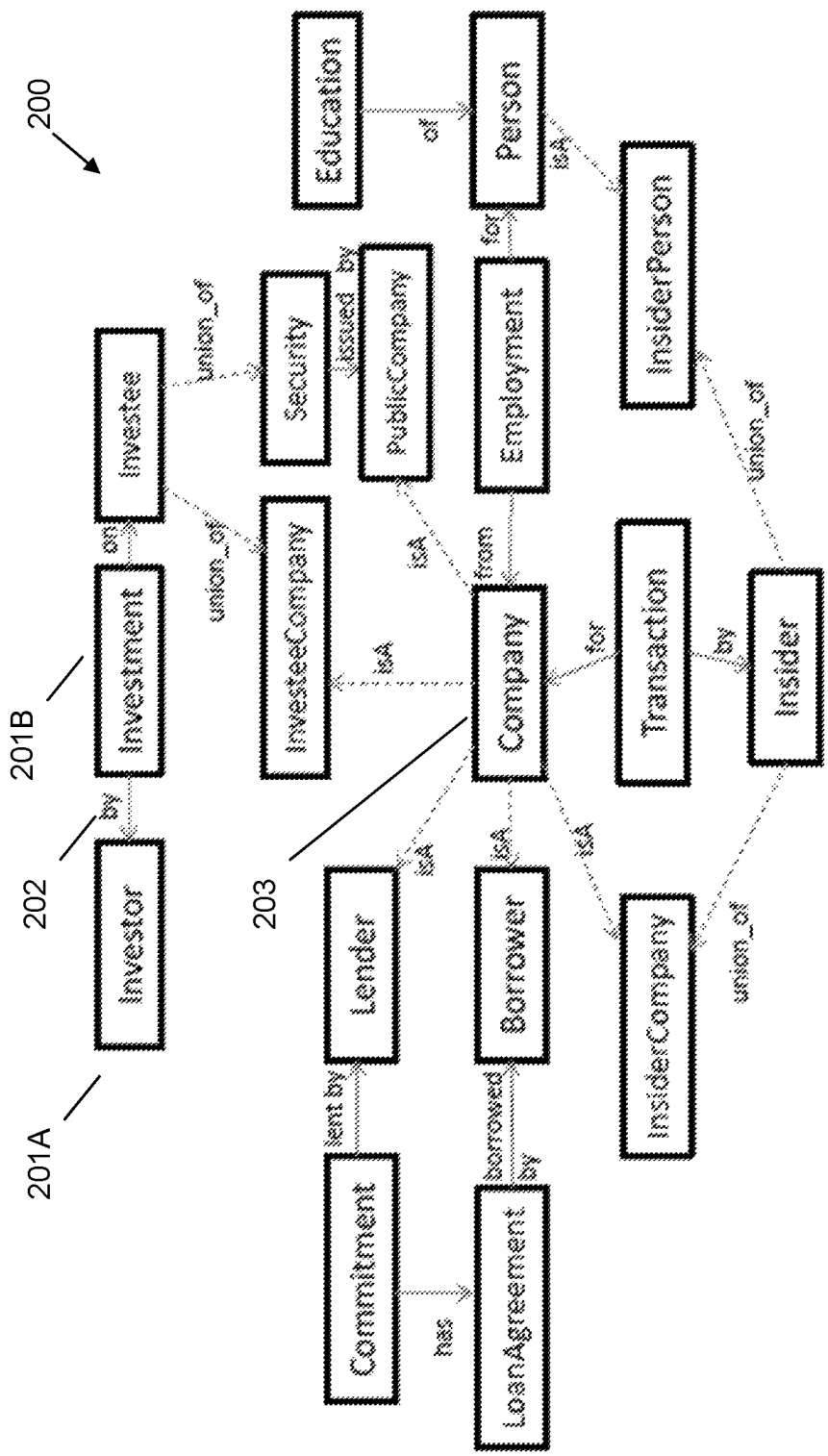
FIG. 2 illustrates an example ontology graph.
Figure 3:
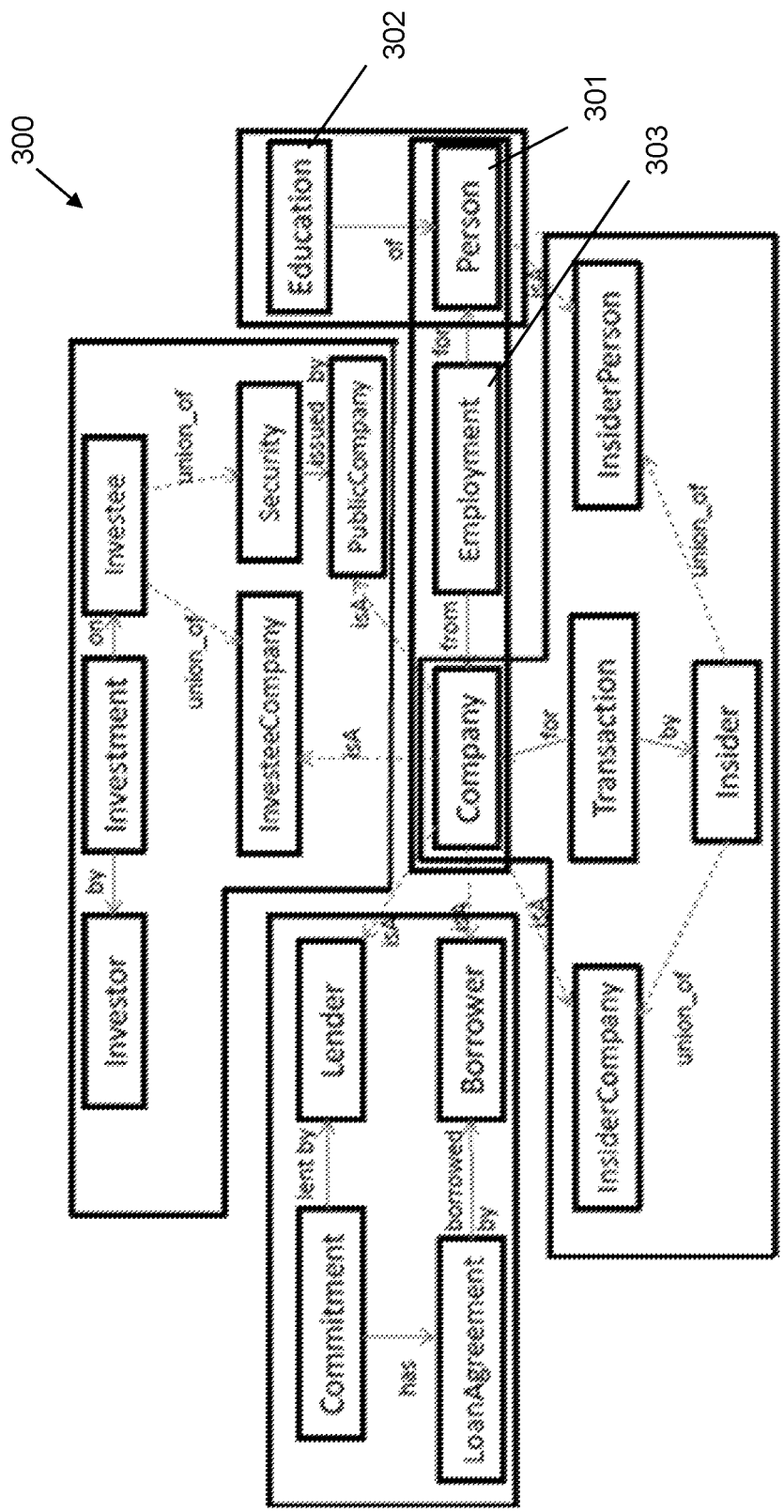
FIG. 3 illustrates an example partitioned ontology graph.

FIG. 2 illustrates a small example of an ontology graph representing the financial domain 200. As can be understood by one skilled in the art, an actual ontology graph is much larger and includes many more elements and relationships. Each concept or individual of the financial domain may be represented by a node within the graph, for example, 201A and 201B. Edges of the graph, for example, 202, connect concepts taking part in a relation. Thus, using element 201A and 201B and the edge between them 202 as an example, the relation identified by the ontology graph is that "Investment" may be made "by" an "Investor." As can be understood using FIG. 2 as an example, each concept or individual includes an ontology path linking the concept or individual to another concept or individual and eventually a central node of the graph, 203 in this example. Thus, each of the ontology paths captures a semantic model between each of the concepts and the connections between concepts.

The ontology graph may be partitioned into functional partitions. Each partition may include components which may consist of a set of concepts. Each component within the functional partition may represent a single domain functionality. The system may identify a set of components that are each related to a functionality. For example, referring to FIG. 3, which shows an example partitioning of the ontology graph represented by FIG. 2. The nodes "Loans," "Employment," "Investments," "Transactions," and "Education" represent five different domain functionalities.

Components may belong to more than one component. For example, referring to FIG. 3, component "Person" 301 belongs to both component "Education" 302 and component "Employment" 303. Thus, components may be non-node disjoint, meaning that nodes are not assigned to a single partition. Additionally, although not shown by FIG. 3, components may be non-edge disjoint, meaning a connection between nodes may be assigned to multiple partitions. Some concepts in an ontology graph may not belong to a component or partition. Since each of the functional partitions captures an existing semantic relationship between member concepts, the partitions can be used to build semantically valid query suggestions.

Figure 4:
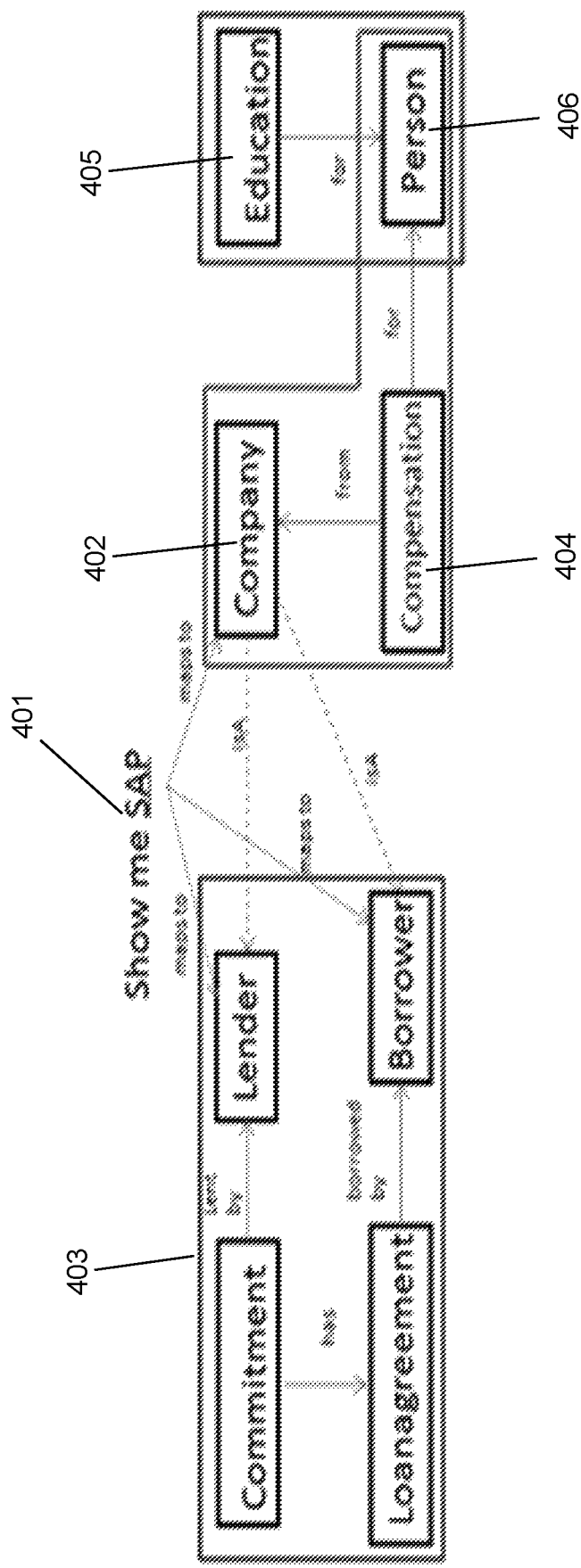
FIG. 4 illustrates an example partitioned ontology graph.

Referring back to FIG. 1 and 102, to determine if the text string can be mapped to an ontology element, the text string may be parsed to extract one or more keywords. These keywords are then used to identify an ontology element that is related to or maps to the keyword. For example, referring to FIG. 4, the partial query 401 "Show me SAP" is parsed to extract the token "SAP." "SAP" is then mapped to the ontology element "Company" 402 having a "Name" property, and also additional child elements belonging to the "Name" property, for example, "Lender" leading to "Loans" 403 and "Compensation" 404 which belongs to the "Company" 402 element. As shown in FIG. 4, for the ontology element of "Loans" 403, the direct mapping is from SAP to "Lender" and "Borrower." However, the functional concept of the partition containing "Lender" and "Borrower" is "Loans." If the text string cannot be mapped to an ontology element at 102, an embodiment may wait for additional input at 104 and then attempt to map the new text string information to an ontology element.

If, however, the text string can be mapped to an ontology element at 102, an embodiment may provide, to the user, at least one suggestion for completing the query request. Using the system and methods as described herein, the suggestion may include a semantically relevant suggestion. To provide a suggestion, an embodiment may traverse the paths in the ontology graph within each of the partitions spanned by the ontology elements that the token was mapped to. Thus, using the example of FIG. 4, possible query suggestions may include "Show me SAP loans" and "Show me SAP compensation," but not "Show me SAP degrees." This is because, although the ontology element "Education" 405 can be reached from ontology element "Person" 406, as can be seen from FIG. 4, it requires traversing through another partition which is not spanned by ontology elements mapped for the query tokens. Therefore, element "Education" 405 will not be used to provide a query suggestion. Thus, the provided suggestions may only include suggestions from those partitions which have a direct connection to the text string.

The system may provide more than one query suggestion. In providing these multiple query suggestions, an embodiment may rank the suggestions to present the most likely as the first suggestion. In one embodiment, the ranking may be completed by identifying how many edges of the ontology graph have to be traversed to reach the suggested ontology element. The query suggestions may then be ranked with the query suggestion having the least number of edges to traverse as the first suggestion and the query suggestion having the most number of edges to traverse as the last suggestion. In other words, the ranking may be in ascending order of the number of edges traversed to reach the suggested ontology element. Queries having the same number of edges may have the same ranking. As a user provides additional text strings, the query suggestions may be updated to reflect the additional text strings. Using the example as represented in FIG. 4, if the user continued providing input to change the partial query 401 to "Show me SAP employees," the query suggestions may now include the "Education" element 405 to provide one of the query suggestions, because the "Education" element 405 now has a direct connection to the query through the mapping of updated token employee to ontology element "Person" 406 in the same partition.

Figure 5:
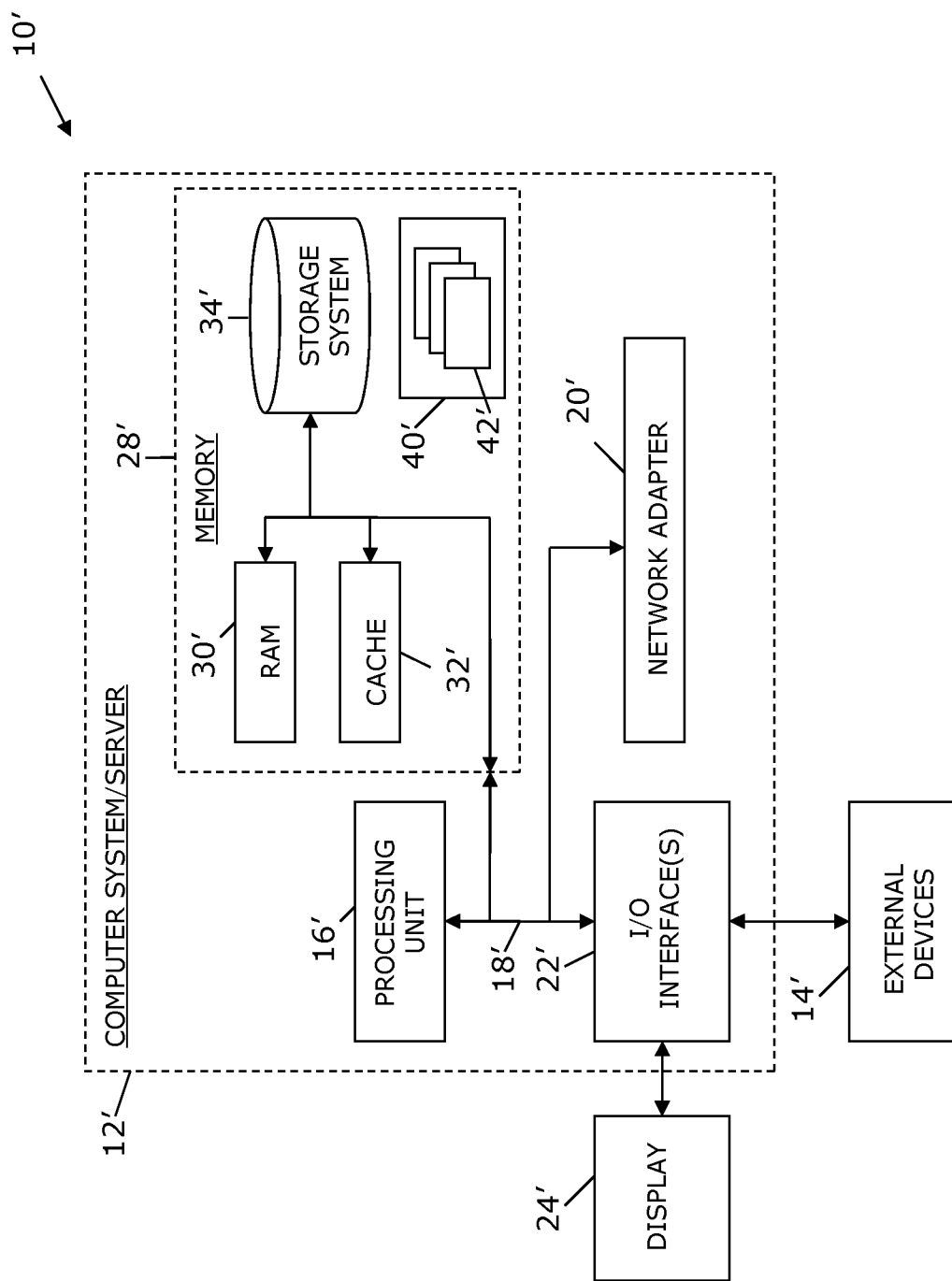
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving a partially completed query request from a user, wherein the partially completed query request comprises at least one text string provided in a query field;
mapping at least one extracted keyword from the at least one text string to at least one ontology element contained within at least one of a plurality of partitions in an ontology graph, wherein each of the plurality of partitions represent a single domain functionality, the ontology graph comprising (i) ontology elements represented as nodes and (ii) connections between ontology elements represented as edges, wherein each of the plurality of partitions corresponds to a subject area of a field and comprises ontology elements corresponding to concepts related to the subject area of the field, wherein the ontology elements included within a partition have a semantic relationship between other ontology elements of the partition; and generating, in view of the plurality of partitions, at least one suggestion for completing the query request to the user, wherein the generating the at least one suggestion comprises generating a plurality of suggestions and ranking the plurality of suggestions, wherein the at least one suggestion comprises a semantically relevant suggestion corresponding to the at least one text string provided in the query field, wherein a semantically relevant suggestion comprises a suggestion generated from an ontology element included within a partition in the ontology graph having a direct connection to the at least one text string, wherein the partition having a direct connection comprises a partition within the ontology graph that does not require traversing through another ontology partition which is not spanned by ontology elements mapped for the query request, and wherein the at least one suggestion is provided in an order based upon a number of edges to be directly traversed within the ontology graph to reach the at least one suggestion.

2. The method of claim 1, comprising identifying a subset of the mapped plurality of partitions having a direct connection to the at least one text string.

3. The method of claim 2, wherein the generating at least one suggestion comprises traversing the connections between ontology elements in a subset of the mapped plurality of partitions having a direct connection to the at least one text string.

4. The method of claim 1, wherein the order of at least one suggestion is based upon a ranking of at least two suggestions by the number of edges in the ontology graph spanned by each of the at least two suggestions.

5. The method of claim 1, comprising generating a partition by grouping ontology elements of the ontology graph having shared concepts.

6. The method of claim 1, wherein the ontology elements within each of the plurality of partitions have a semantic relationship, wherein the semantic relationship is based upon the concepts the ontology elements correspond to.

7. The method of claim 1, wherein the ontology graph is selected from the group consisting of a field or a domain.

8. The method of claim 1, comprising updating the at least one suggestion for completing the query request based upon receiving additional text strings within the query field.

9. The method of claim 1, wherein the ranking the plurality of suggestions comprises ranking the query suggestion with the least number of edges to traverse as the first suggestion and the query suggestion having the most number of edges to traverse as the last suggestion.

10. An apparatus, comprising:
at least one processor; and
a computer readable storage medium having computer readable program code embodied therewith and executable by the at least one processor, the computer readable program code comprising:
computer readable program code that receives a partially completed query request from a user, wherein the partially completed query request comprises at least one text string provided in a query field;
computer readable program code that maps at least one extracted keyword from the at least one text string to at least one ontology element contained within at least one of a plurality of partitions in an ontology graph, wherein each of the plurality of partitions represent a single domain functionality, the ontology graph comprising (i) ontology elements represented as nodes and (ii) connections between ontology elements represented as edges, wherein each of the plurality of partitions corresponds to a subject area of a field and comprises ontology elements corresponding to concepts related to the subject area of the field, wherein the ontology elements included within a partition have a semantic relationship between other ontology elements of the partition; and computer readable program code that generates, in view of the plurality of partitions, at least one suggestion for completing the query request to the user, wherein the generating the at least one suggestion comprises generating a plurality of suggestions and ranking the plurality of suggestions, wherein the at least one suggestion comprises a semantically relevant suggestion corresponding to the at least one text string provided in the query field, wherein a semantically relevant suggestion comprises a suggestion generated from an ontology element included within a partition in the ontology graph having a direct connection to the at least one text string, wherein the partition having a direct connection comprises a partition within the ontology graph that does not require traversing through another ontology partition which is not spanned by ontology elements mapped for the query request, and wherein the at least one suggestion is provided in an order based upon a number of edges to be directly traversed within the ontology graph to reach the at least one suggestion.

11. A computer program product, comprising:
a computer readable storage medium having computer readable program code embodied therewith, the computer readable program code executable by a processor and comprising:
computer readable program code that receives a partially completed query request from a user, wherein the partially completed query request comprises at least one text string provided in a query field;
computer readable program code that maps at least one extracted keyword from the at least one text string to at least one ontology element contained within at least one of a plurality of partitions in an ontology graph, wherein each of the plurality of partitions represent a single domain functionality, the ontology graph comprising (i) ontology elements represented as nodes and (ii) connections between ontology elements represented as edges, wherein each of the plurality of partitions corresponds to a subject area of a field and comprises ontology elements corresponding to concepts related to the subject area of the field, wherein the ontology elements included within a partition have a semantic relationship between other ontology elements of the partition; and
computer readable program code that generates, in view of the plurality of partitions, at least one suggestion for completing the query request to the user, wherein the generating the at least one suggestion comprises generating a plurality of suggestions and ranking the plurality of suggestions, wherein the at least one suggestion comprises a semantically relevant suggestion corresponding to the at least one text string provided in the query field, wherein a semantically relevant suggestion comprises a suggestion generated from an ontology element included within a partition in the ontology graph having a direct connection to the at least one text string, wherein the partition having a direct connection comprises a partition within the ontology graph that does not require traversing through another ontology partition which is not spanned by ontology elements mapped for the query request, and wherein the at least one suggestion is provided in an order based upon a number of edges to be directly traversed within the ontology graph to reach the at least one suggestion.

12. The computer program product of claim 11, comprising identifying a subset of the mapped plurality of partitions having a direct connection to the at least one text string.

13. The computer program product of claim 12, wherein the generating at least one suggestion comprises traversing the connections between ontology elements in a subset of the mapped plurality of partitions having a direct connection to the at least one text string.

14. The computer program product of claim 11, wherein the order of at least one suggestion is based upon a ranking of at least two suggestions by the number of edges in the ontology graph spanned by each of the at least two suggestions.

15. The computer program product of claim 11, comprising generating a partition by grouping ontology elements of the ontology graph having shared concepts.

16. The computer program product of claim 11, wherein the ontology elements within each of the plurality of partitions have a semantic relationship, wherein the semantic relationship is based upon the concepts the ontology elements correspond to.

17. The computer program product of claim 11, wherein the ontology graph is selected from the group consisting of a field or a domain.

18. The computer program product of claim 11, comprising updating the at least one suggestion for completing the query request based upon receiving additional text strings within the query field.

19. The computer readable code of claim 11, wherein the ranking the plurality of suggestions comprises ranking the query suggestion with the least number of edges to traverse as the first suggestion and the query suggestion having the most number of edges to traverse as the last suggestion.

20. A method, comprising:
utilizing at least one processor to execute computer code that performs the steps of:
receiving, from a user, a partially completed query request provided in a query field; and
providing, to the user, at least one suggestion for completing the query request, wherein the providing at least one suggestion comprises:
accessing an ontology graph related to a domain of the partially completed query request, wherein the ontology graph comprises a plurality of ontology elements, each ontology element comprising a concept represented by a node within the ontology graph and connections between the nodes being represented by edges within the ontology graph;
partitioning the ontology elements of the ontology graph into functional partitions, each functional partition comprising ontology elements having a semantic relationship between other ontology elements of the partition, each of the functional partitions representing a single domain functionality;
mapping at least one extracted keyword of the partially completed query request to at least one of the ontology elements;
identifying each of the functional partitions containing the mapped-to ontology elements; and
generating at least one suggestion in view of each of the identified functional partitions, wherein generating the at least one suggestion comprises generating a plurality of suggestions and ranking the plurality of suggestions, wherein the generating at least one suggestion comprises generating a semantically relevant suggestion comprising a suggestion generated from an ontology element included within a partition in the ontology graph having a direct connection to the at least a subset of the partially completed query request, wherein the partition having a direct connection comprises a partition within the ontology graph that does not require traversing through another ontology partition which is not spanned by ontology elements mapped for the query request, and wherein the at least one suggestion is provided in an order based upon a number of edges to be directly traversed within the ontology graph to reach the at least one suggestion.

* * * * *